United States Patent
Harrang et al.

(10) Patent No.: US 11,303,725 B2
(45) Date of Patent: Apr. 12, 2022

(54) CONDITIONAL PRE-DELIVERY OF CONTENT TO A USER DEVICE

(71) Applicant: Opanga Networks, Inc., Seattle, WA (US)

(72) Inventors: Jeffrey Paul Harrang, Seattle, WA (US); Ben Hadorn, Seattle, WA (US); John Burnette, Seattle, WA (US); David Gibbons, Seattle, WA (US)

(73) Assignee: Opanga Networks, Inc., Seattle, WA (US)

( * ) Notice: Subject to any disclaimer, the term of this patent is extended or adjusted under 35 U.S.C. 154(b) by 79 days.

(21) Appl. No.: 16/688,885

(22) Filed: Nov. 19, 2019

(65) Prior Publication Data

US 2020/0084294 A1     Mar. 12, 2020

Related U.S. Application Data

(63) Continuation of application No. 14/506,492, filed on Oct. 3, 2014, now Pat. No. 10,511,688.
(Continued)

(51) Int. Cl.
*H04L 29/08* (2006.01)
*H04L 29/06* (2006.01)
(Continued)

(52) U.S. Cl.
CPC ........ *H04L 67/322* (2013.01); *H04L 41/0896* (2013.01); *H04L 65/4084* (2013.01);
(Continued)

(58) Field of Classification Search
None
See application file for complete search history.

(56) References Cited

U.S. PATENT DOCUMENTS 7,756,913 B1 * 7/2010 Day ................. H04L 67/306
 707/821
7,761,583 B2 * 7/2010 Shull ................ H04L 63/1491
 709/229

(Continued)

FOREIGN PATENT DOCUMENTS

KR    20080019972 A    3/2008
KR    20090076161 A    7/2009
(Continued)

OTHER PUBLICATIONS

Extended European Search Report for EP Application No. 14850868. 2, dated Jun. 2, 2017.
(Continued)

*Primary Examiner* — Uzma Alam (57) ABSTRACT

Systems and methods for delivering content to user devices before the content is selected or requested (e.g. a pre-delivery of content) within predetermined delivery windows and/or during suitable pre-delivery conditions are described. In some embodiments, the systems and methods receive an indication that content is available for pre-delivery from a content server to a user device over a network, select a delivery window that satisfies one or more pre-delivery policy conditions associated with pre-delivery of content to the user device, and cause the content to be delivered to the user device upon commencement of the selected delivery window.

20 Claims, 5 Drawing Sheets

Related U.S. Application Data (60) Provisional application No. 61/886,719, filed on Oct. 4, 2013.

(51) Int. Cl.

| | | |
|---|---|---|
| *H04W 4/18* | (2009.01) | |
| *H04L 12/24* | (2006.01) | |
| *H04L 67/61* | (2022.01) | |
| *H04L 67/06* | (2022.01) | |
| *H04L 67/62* | (2022.01) | |
| *H04L 67/5681* | (2022.01) | |
| *H04L 65/80* | (2022.01) | |
| *H04L 41/0896* | (2022.01) | |
| *H04L 65/612* | (2022.01) | |

(52) U.S. Cl.
CPC .............. *H04L 65/80* (2013.01); *H04L 67/06* (2013.01); *H04L 67/2847* (2013.01); *H04L 67/325* (2013.01); *H04W 4/18* (2013.01)

(56) References Cited

U.S. PATENT DOCUMENTS

| | | | | |
|---|---|---|---|---|
| 8,169,916 | B1 * | 5/2012 | Pai | H04N 21/8456 |
| | | | | 370/238 |
| 9,253,051 | B2 * | 2/2016 | Phillips | H04L 41/0893 |
| 2001/0014103 | A1 | 8/2001 | Burns et al. | |
| 2003/0172060 | A1 * | 9/2003 | Uchikado | G06F 16/9535 |
| 2003/0172163 | A1 * | 9/2003 | Fujita | H04L 67/1017 |
| | | | | 709/226 |
| 2006/0073810 | A1 * | 4/2006 | Pyhalammi | H04L 12/1489 |
| | | | | 455/407 |
| 2007/0094274 | A1 | 4/2007 | Jung | |
| 2008/0139189 | A1 | 6/2008 | Hyatt | |
| 2009/0276386 | A1 * | 11/2009 | Greening | H04L 47/15 |
| | | | | 706/47 |
| 2011/0041161 | A1 * | 2/2011 | Capati | G06F 21/10 |
| | | | | 726/4 |
| 2011/0143651 | A1 * | 6/2011 | Marocchi | H04L 65/1089 |
| | | | | 455/3.06 |
| 2012/0054336 | A1 * | 3/2012 | Priyadarshan | G06Q 30/02 |
| | | | | 709/224 |
| 2012/0174198 | A1 * | 7/2012 | Gould | G06F 21/335 |
| | | | | 726/6 |
| 2012/0300687 | A1 * | 11/2012 | Aksu | H04L 12/189 |
| | | | | 370/312 |
| 2013/0081072 | A1 * | 3/2013 | Alward | H04L 41/145 |
| | | | | 725/14 |
| 2013/0117349 | A1 * | 5/2013 | Burnette | G06Q 30/0201 |
| | | | | 709/202 |
| 2014/0032468 | A1 * | 1/2014 | Anandaraj | G06Q 30/02 |
| | | | | 706/46 |
| 2014/0280996 | A1 * | 9/2014 | Harrang | H04L 67/2842 |
| | | | | 709/229 |
| 2014/0304328 | A1 * | 10/2014 | Capati | G06F 21/00 |
| | | | | 709/203 |

FOREIGN PATENT DOCUMENTS

| | | | | |
|---|---|---|---|---|
| WO | WO2005099230 | A1 | 10/2005 | |
| WO | WO-2009042304 | A1 * | 4/2009 | ............. H04H 20/57 |
| WO | WO-2013078620 | A1 * | 6/2013 | ........... H04N 21/222 |

OTHER PUBLICATIONS

International Search Report and Written Opinion for PCT/US2014/059164, filed Oct. 3, 2014.

* cited by examiner

CONDITIONAL PRE-DELIVERY OF CONTENT TO A USER DEVICE

CROSS-REFERENCES TO RELATED APPLICATIONS

This application is a continuation of U.S. application Ser. No. 14/506,492, filed Oct. 3, 2014, which claims the benefit of U.S. Provisional Application No. 61/886,719, filed on Oct. 4, 2013, which is hereby incorporated by reference in its entirety.

BACKGROUND

Many user devices include and support a varied suite of mobile applications, or "apps," enabling users to download and install many different applications to their user devices. The different applications, some of which include components configured to present content to users, may have different or custom online content interfaces and retrieval/delivery protocols. Additionally, the applications may request for and receive content (e.g., video content, audio content, and so on) from various different online, networked, and/or remote content sources, such as content delivery networks (CDNs), remote content servers, remote content storage sites, and so on.

Content is often delivered from remote content servers or associated edge caches to requesting devices (e.g., mobile or other user devices) over a network. Typically, a content provider or other network component utilizes cache controllers and associated algorithms to determine the content delivered to user devices that should be cached, such as content that is predicted to be popular, viral, and/or often requested by user devices. Therefore, when a user device requests delivery of a popular piece of content, the content provider, via the network edge cache, is able to quickly respond and deliver the requested content to the user device from the network edge cache that is proximate to the requesting user device.

Often, the delivery of content to a user device from a remote content source is less than optimal, especially when the user wishes to immediately consume the content. For example, the delivery of content from a remote server to a user device may be slow or ineffective due to limitations at the content source, in the delivery network, and so on.

SUMMARY

Systems and methods for delivering content to user devices before the content is selected or requested (e.g., a pre-delivery of content) and during network or other conditions suitable for pre-delivery (e.g., during established or identified predetermined delivery windows) are described. In some embodiments, the systems and methods receive an indication or otherwise determine that content is available for pre-delivery from a content server to a user device over a network, select a delivery window that satisfies one or more pre-delivery policy conditions associated with pre-delivery of content to the user device, and cause the content to be delivered to the user device upon commencement of the selected delivery window.

For example, the systems and methods may determine that a delivery window (e.g., a time period, an event, an occurrence or confluence of suitable pre-delivery conditions) predicted to satisfy one or more predetermined conditions associated with a suitable network via which to pre-deliver content to the user device has commenced, identify one or more content items located at a remote content server are available for pre-delivery to the user device, and cause at least a portion of the identified one or more content items to be delivered to the user device within the delivery window.

DETAILED DESCRIPTION

Systems and methods for delivering content to user devices before the content is selected or requested (e.g. a pre-delivery of content), such as during current or predicted delivery windows or conditions, are described. In some embodiments, the systems and methods include a pre-delivery system that selects delivery windows associated with one or more pre-delivery policy conditions associated with pre-delivery of content to a user device, and causes the content to be delivered to the user device upon commencement of the selected delivery window. The pre-delivery of content may include a delivery or transfer of content items from a remote content server to the user device before a user selects or identifies the content items for playback (or, before the user launches an application associated with the content items). The pre-delivery system, therefore, may cause delivery of certain content items in advance and in anticipation of an application receiving a request from the user to playback the content items.

For example, a user (e.g., a consumer) is associated with a smart phone that includes a client or application configured to pre-deliver content to the smart phone. In the background, the client monitors and/or predicts past, current, and future network related conditions. Upon receiving an indication that a content item is available for pre-delivery, the client identifies a delivery window or time period that satisfies predetermined delivery conditions (e.g., a certain type of network at a certain time of day), and causes the content item (or, a portion of the content item) to be delivered to the smart phone during the identified delivery window.

Once the content item, or portion thereof, is pre-delivered to the smart phone (e.g., to local storage of the smart phone), the smart phone, via a requesting application, can immediately play back the content item from the local storage, and thus provide a reliable and instantaneous playback experience to the user, among other benefits.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

Figure 1:
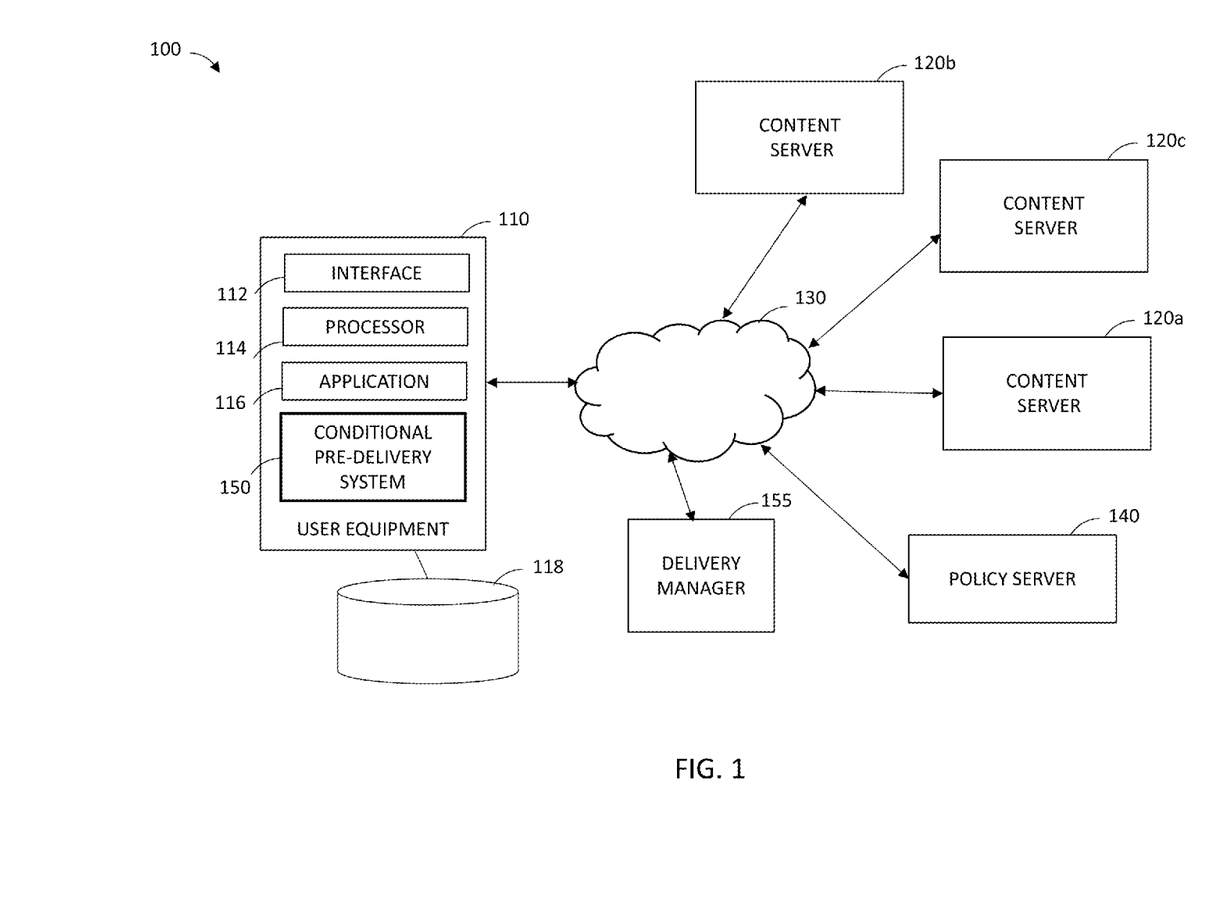
FIG. 1 is a block diagram illustrating a suitable computing environment.

FIG. 1 is a block diagram illustrating a suitable network environment 100 for the delivery of content to user devices, such as the pre-delivery or anticipated delivery of content to user devices. The network environment 100 includes one or more user equipment or user devices 110, one or more content servers 120a-c, and a policy server 140 that communicate with one another over a data communication network 130.

Any of the machines, databases, or devices shown in FIG. 1 may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices. For example, the policy server 140 and the content servers 120a-c may be combined as a single server (e.g., one content server that provides the functionality of delivering content and monitoring and applying pre-delivery policy conditions).

The content servers 120a-c may provide a variety of different media and other content types, such as video content (e.g., movies, television shows, news programming, video clips), image content (e.g., image or picture slideshows), audio content (e.g., radio programming, music, podcasts), and so on. The content servers 120a-c may deliver, transfer, transport, and/or otherwise provide media files and other content to network edge caches (not shown), which may deliver, transfer, transport, and/or otherwise provide the content to requesting devices (e.g., user equipment 110a-c) via various media transfer protocols (e.g., Hypertext Transfer Protocol (HTTP), File Transfer Protocol (FTP), HTTP Live Streaming (HLS), HTTP Dynamic Streaming (HDS), HTTP Smooth Streaming (HSS), Dynamic Adaptive Streaming over HTTP (DASH), Real Time Streaming Protocol (RTSP), and so on).

The network 130 may be any network that enables communication between or among machines, databases, and devices. Accordingly, the network 130 may be a wide access network (WAN), wired network, a fiber network, a wireless network (e.g., a mobile or cellular network), a cellular or telecommunications network (e.g., WiFi, Global System for Mobile Communications (GSM), Universal Mobile Telecommunications System (UMTS), Long Term Evolution (LTE) network), or any suitable combination thereof. The network 130 may include one or more portions of a private network, a public network (e.g., the Internet), or any suitable combination thereof.

The user equipment 110 may include various types of user devices, such as mobile devices (e.g., laptops, smart phones, tablet computers, and so on), computing devices, set-top boxes, vehicle computing devices, gaming devices, and so on. The user equipment 110a-c may support and run various different operating systems, such as Microsoft® Windows®, Mac OS®, iOS®, Google® Chrome®, Linux®, Unix®, or any other mobile operating system, including Symbian®, Palm®, Windows Mobile®, Google® Android®, Mobile Linux®, and so on.

The user equipment 110 may also support various components configured to request, receive, display, and/or present content to users associated with the user equipment 110. For example, the user equipment 110 may include applications 116, such as an app, browser, or other component that sends requests for content to content servers 120a-c and presents received content to the users via various display or presentation components, such as a user interface 112. The user equipment 110 may also include a processor 114 and local storage or caches 118, such as a local cache or data store that stores received content (e.g., pre-delivered or device cached content) and provides the stored content to the requesting applications 112. A local cache or storage 118 may be, for example, a storage or memory component contained by the user equipment 110, a detachable storage component that may be attached to the user equipment 110, a storage device associated with a local access network (LAN) that includes the user equipment 110, and/or other storage locations or devices that store media, files, and other data for the user equipment 110 (e.g., a storage location or device that provides storage and is accessible only by a certain or associated user equipment 110).

In some embodiments, the user equipment 110 collects and stores a local application inventory list and application usage data, and provides or transmits application information to the policy server 140, information identifying one or more applications resident on the user equipment 110. For example, the user equipment 110 may transmit an application information file, which includes information identifying applications 116 resident on the user equipment 110 and application usage information identifying historical usage of the applications resident on the user equipment 110.

The user equipment 110 may periodically inventory the applications 116 currently installed on the user equipment 110. For example, the user equipment 110 may query the operating system (OS) of the user equipment 110 or an application registration service employed by the user equipment 110 to obtain a list of unique identifiers for the applications installed and resident on the user equipment 110. In some cases, the user equipment 110 may generate the list of unique identifiers by inspecting the storage 118 of the user equipment 110, such as by searching for executable files having known names.

Further details regarding the discovery of available content and/or pre-delivery of content may be found in commonly-assigned and co-pending U.S. patent application Ser. No. 14/335,826, filed on Jul. 18, 2014, entitled CONTENT SOURCE DISCOVERY, commonly-assigned and co-pending U.S. patent application Ser. No. 14/212,934, filed on Mar. 14, 2014, entitled PRE-DELIVERY OF CONTENT TO DEVICES, and commonly-assigned and co-pending U.S. patent application Ser. No. 14/448,876, filed on Jul. 31, 2014, entitled PRE-DELIVERY OF CONTENT TO A USER DEVICE, which are hereby incorporated by reference in their entirety.

In some embodiments, the network environment 100 may include a delivery manager 155, which directs or otherwise manages the delivery of content between devices, such as from the content servers 120a-c to the user equipment 110, from the user equipment 110 to the content servers 120a-c, between user equipment, between content servers (e.g., from content server 120b to content server 120c), and so on. The delivery manager 155 may, when instructed, track, store, and/or provide information associated with various network delivery policies and/or protocols utilized during the delivery of content over the network 130. Although the delivery manager 155 is depicted as being separate from the content servers 120a-c, any of the content servers 120a-c and/or the policy server 140 may include some or all components of the delivery manager 155. Additionally, in some configurations, the delivery manager 155 and/or the content servers 120a-c may include some or all components of the policy server 140.

In some embodiments, the delivery manager 155 directs or manages the delivery of content via a delivery policy that utilizes or uses surplus network bandwidth or surplus network capacity. A surplus of network bandwidth or network capacity may be network bandwidth or network capacity that is determined to be available (e.g., idle or free) in a network in view of the total capacity of the network and/or and the total usage of the network. In some embodiments, a network provider determines the amount of surplus network capacity available in a network in view of the total capacity of the network and/or and the total usage of the network. The surplus network capacity may be determined statically or dynamically, and, therefore, a determined surplus network capacity for a network may vary substantially and/or randomly over time (e.g., during peak use periods), for long or short time scales, and/or between one service provider to another.

The surplus capacity, therefore, may be the free bandwidth or capacity between an actual and/or current usage of the bandwidth a total capacity (or, a predetermined percentage of the total capacity). Therefore, the delivery manager 155 may direct or manage the delivery of content between content providers 120a-c, network edge caches (not shown), and user equipment 110 over various selected delivery policies or protocols that utilize free, available, idle, or otherwise surplus bandwidths or capacities of networks, such as paths or protocols that deliver data over currently underused networks that would not otherwise be in use, and/or without substantially impacting or altering the transport performance associated with other data traffic sharing the network.

Further details regarding the delivery of content using surplus network capacity, may be found in commonly-assigned U.S. Pat. No. 7,500,010, issued on Mar. 3, 2009, entitled ADAPTIVE FILE DELIVERY SYSTEM AND METHOD, U.S. Pat. No. 8,589,585, issued on Nov. 19, 2013, entitled ADAPTIVE FILE DELIVERY SYSTEM AND METHOD, U.S. Published Patent Application No. 2010/0198943, filed on Apr. 15, 2010, entitled SYSTEM AND METHOD FOR PROGRESSIVE DOWNLOAD USING SURPLUS NETWORK CAPACITY, and U.S. Published Patent Application No. 2013/0124679, filed on Jan. 3, 2013, entitled SYSTEM AND METHOD FOR PROGRESSIVE DOWNLOAD WITH MINIMAL PLAY LATENCY, all of which are hereby incorporated by reference in their entirety.

In some embodiments, the user equipment 110 includes a conditional pre-delivery system 150 that includes components configured to select and cause pre-delivery of certain content items, such as content items identified via information (e.g., a manifest file) provided by the policy server 140, which stores information associated with pre-delivery policy conditions, mobile applications, content sources, and available content, and provides a customized manifest file to the user equipment 110 that is based on the custom configuration of the applications resident on the user equipment 110. The conditional pre-delivery system 150 may select or determine a delivery window, such as a current or future time period or event, within or during which to pre-deliver content to the user equipment 110.

The conditional pre-delivery system 150 may include or be part of a device-resident content pre-delivery software client that detects one or combinations of past, current and/or future (predicted) conditions of the network 130 or networks linking the user equipment 110 with the remote content servers 120a-c. The conditional pre-delivery system 150 may evaluate or compare the network conditions against a set of determined policy rules stored at the policy server 140 or within local storage 118, and determine when to pre-deliver content based on the comparisons. Further details regarding the components and processes performed by the conditional pre-delivery system 150 are described herein.

Examples of Conditionally Pre-Delivering Content to User Devices

Figure 2:
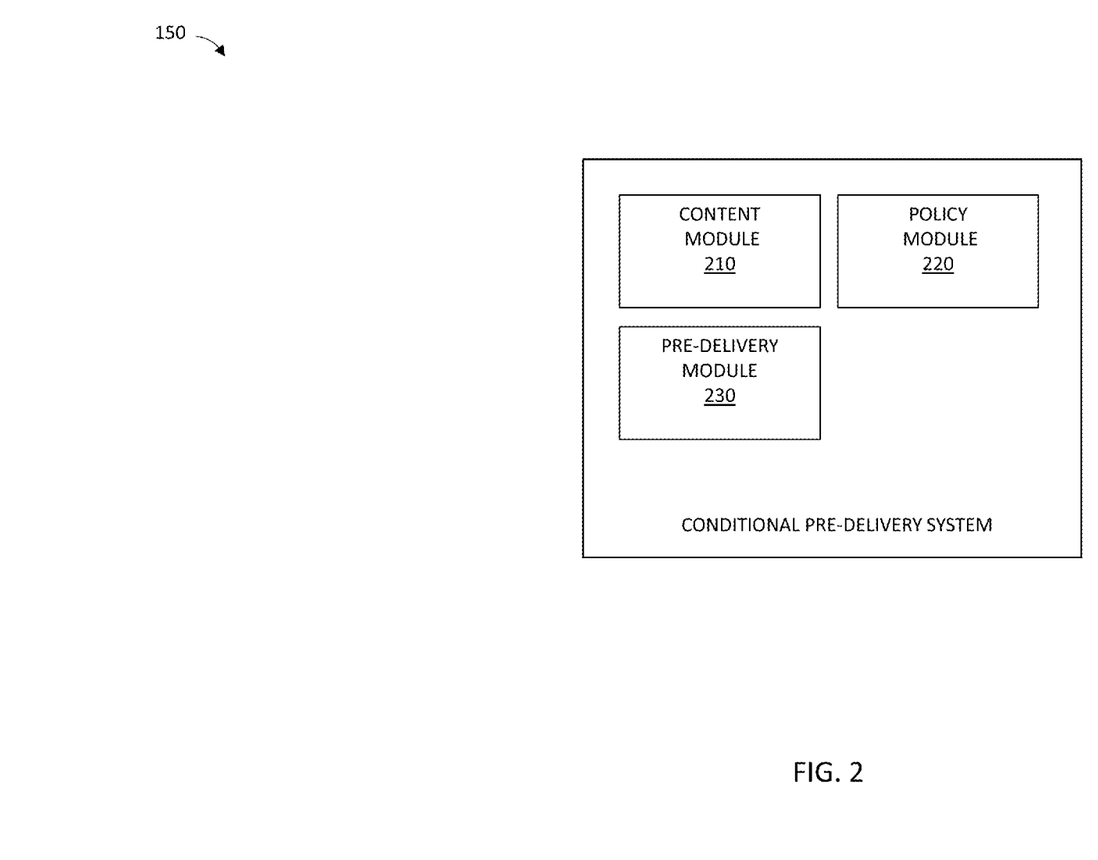
FIG. 2 is a block diagram illustrating components of a conditional pre-delivery system.

As described herein, in some embodiments, the conditional pre-delivery system 150 determines a delivery window, such as one or more instances of suitable conditions, one or more time periods of suitable conditions, and so on, within which to pre-deliver content items to user devices. FIG. 2 is a block diagram illustrating the components of the conditional pre-delivery system 150.

The conditional pre-delivery system 150 may include one or more modules and/or components to perform one or more operations of the conditional pre-delivery system 150. The modules may be hardware, software, or a combination of hardware and software, and may be executed by one or more processors. For example, the conditional pre-delivery system 150 may include a content module 210, a policy module 220, and a pre-delivery module 230.

In some embodiments, the content module 210 is configured and/or programmed to receive an indication that content is available for pre-delivery from a content server to a user device over a network. For example, the content module 210 may receive information from the policy server 140 that identifies content items available for pre-delivery to the user device 110, such as content items at the remote content servers 120a-c and associated with mobile applications 116 of the user device 110 that play multimedia content (e.g., video, audio, and so on), and/or may identify available content items as part of a pre-delivery client of the user device. As described herein, the pre-delivery of content is a delivery of content to the user device before a user of the user device inputs a request to retrieve or play back the content via the user device (e.g., pre-delivery of content anticipates the content of interest to the user at a later, future, time).

In some embodiments, the policy module 220 is configured and/or programmed to select or determine a delivery window that satisfies one or more pre-delivery policy conditions associated with pre-delivery of content to the user device. For example, the policy module 220 may determine a condition defining a suitable network type via which to pre-deliver content to the user device is currently satisfied and/or may predict one or more predetermined conditions associated with a suitable network via which to pre-deliver content to the user device will be satisfied at a future time.

As described herein, the policy module 220 may apply one or more pre-delivery policy conditions or rules when determining and/or selecting a time period within which to pre-deliver content to the user device 110. The conditions, which may be predetermined and statically applied to some or all cases, may be configured by an administrator at the policy server 140, and defined by network condition metric checks. Example conditions include:

a condition that identifies a pre-delivery network as a wireless network or other certain delivery or serving network type (e.g., 3G, LTE, WiFi, and so on);

a condition that identifies a pre-delivery network as a home network associated with the user device;

a condition that identifies a pre-delivery network as a specific network operator of a network associated with the user device;

a condition that identifies a certain time period (e.g., time of day, day of week) within which to pre-deliver content to the user device;

a condition that identifies a certain location (e.g., a geolocation, a network attachment point or base station ID) of the user device at which to pre-deliver content to the user device;

a condition that identifies a network access status (e.g., "home" or "roaming) for the user device;

a condition that identifies a current or predicted network performance (e.g., a certain average data throughput) for the delivery network;

a condition that identifies a current channel quality (QoS) for the delivery network;

a condition that identifies a user account status for a user associated with the user device;

a condition that identifies a content file delivery status (e.g., "immediate," "standard," "anytime");

a condition that identifies certain device specific events (e.g., the device is not in use, the battery life of the device is at or below a threshold amount of power, the device is or is not plugged in, the device is in motion or is stationary), the device has been idle or not in use for a certain period of time; and so on.

The policy module 220, therefore, may apply various different logical constructs of one or more conditions when determining delivery windows within which to pre-deliver content. For example, the policy module 220 may apply various different rules, such as the following example rules:

IF (network condition A and network condition B), then (pre-deliver entire content item), or IF (network condition A and device condition C), then (pre-deliver a first portion of content item), or IF (network condition D or device condition B), then (defer pre-delivery), and so on.

Thus, the policy module 220 may identify the network related conditions associated with a current or future delivery window, and perform actions associated with the identified conditions, such as actions to pre-deliver content, actions to defer pre-delivery of content, actions to pre-deliver a portion or fraction of the content, and so on.

In some embodiments, the policy module 220 may utilize information identifying a usefulness or other play back metrics associated with the content available for pre-delivery. For example, the policy module 220 may determine a predicted time period within which a user of the user device will request playback of the content based on previous playback patterns associated with the user and/or based on previous playback patterns associated with the content, and select a delivery window that satisfies the one or more pre-delivery policy conditions and occurs before the predicted time period.

In some embodiments, the pre-delivery module 230 is configured and/or programmed to cause the content to be delivered to the user device upon commencement of the selected delivery window. For example, the pre-delivery module 230 causes the content, or a portion of the content, to be delivered to the user device during one or more delivery windows (e.g., during occurrences of suitable network and/or device conditions) before receiving a request from a user associated with the user device to playback the content.

Figure 3:
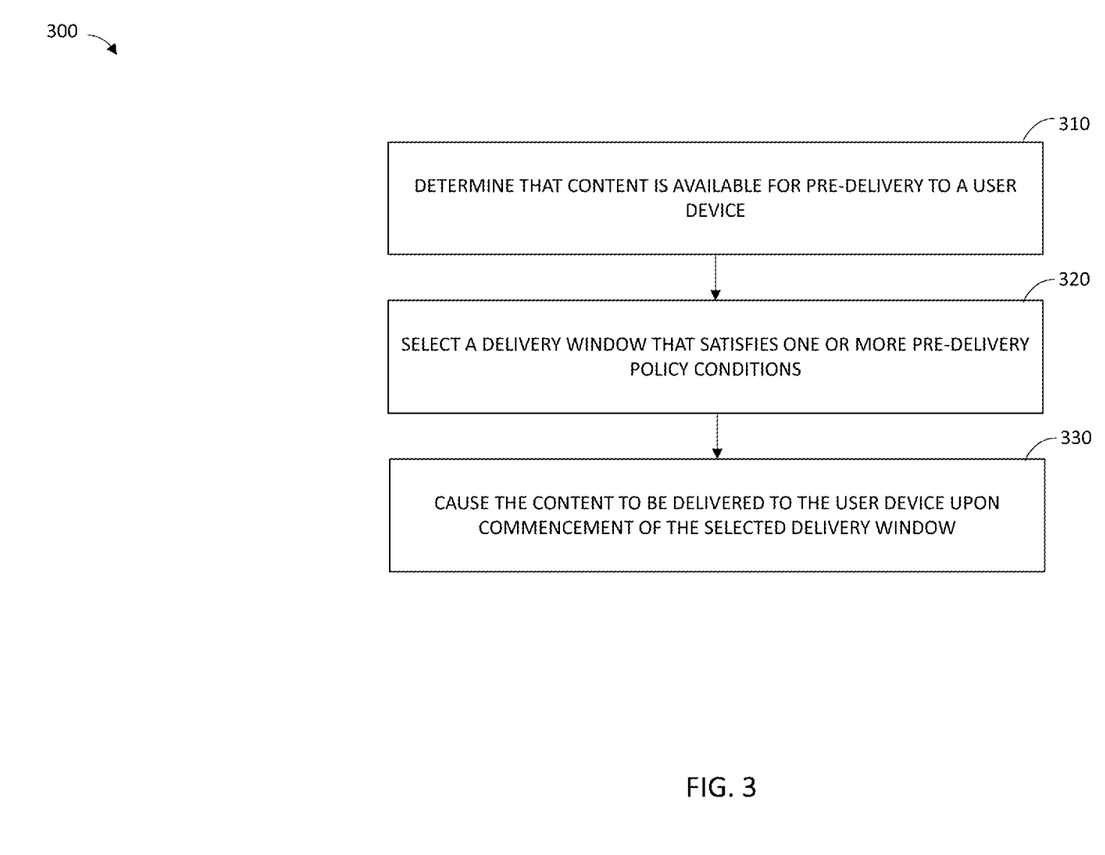
FIG. 3 is a flow diagram illustrating a method for pre-delivering content to a user device within a determined delivery window.

As described herein, the conditional pre-delivery system 150 may perform various different methods, processes, and/or algorithms when determining when to pre-deliver content to the user device 110. FIG. 3 is a flow diagram illustrating a method 300 for pre-delivering content to a user device within a determined delivery window. The method 300 may be performed by the conditional pre-delivery system 150 and, accordingly, is described herein merely by way of reference thereto. It will be appreciated that the method 300 may be performed on any suitable hardware.

In operation 310, the conditional pre-delivery system 150 receives an indication that content is available for pre-delivery from a content server to a user device over a network. For example, the content module 210 may receive information from the policy server 140 that identifies content items available for pre-delivery to the user device 110, such as content items at the remote content servers 120*a-c* and associated with mobile applications 116 of the user device 110 that play multimedia content (e.g., video, audio, and so on).

In operation 320, the conditional pre-delivery system 150 selects a delivery window that satisfies one or more pre-delivery policy conditions associated with pre-delivery of content to the user device. For example, the policy module 220 may select a delivery window that satisfies a condition defining a suitable network type via which to pre-deliver content to the user device and/or may select a future delivery window predicted to satisfy one or more predetermined conditions associated with a suitable network via which to pre-deliver content to the user device. The policy module 220, therefore, selects delivery windows for pre-delivery that are associated with certain pre-delivery conditions being currently satisfied and/or being predicted to be satisfied in the future. A delivery window or windows, therefore, is associated with an occurrence, event, or time period when pre-delivery conditions are met, satisfied, or predicted to be met or satisfied.

In some embodiments, the conditional pre-delivery system 150 may select a future time window predicted to satisfy the one or more pre-delivery policy conditions associated with pre-delivery of content to the user device and/or select a future time window associated with historical pre-delivery of content to the user device.

In operation 330, the conditional pre-delivery system 150 causes the content to be delivered to the user device upon commencement or occurrence of the selected delivery window. For example, the pre-delivery module 230 causes the content, or a portion of the content, to be delivered to the user device within the delivery window before receiving a request from a user associated with the user device to playback the content.

Figure 4:
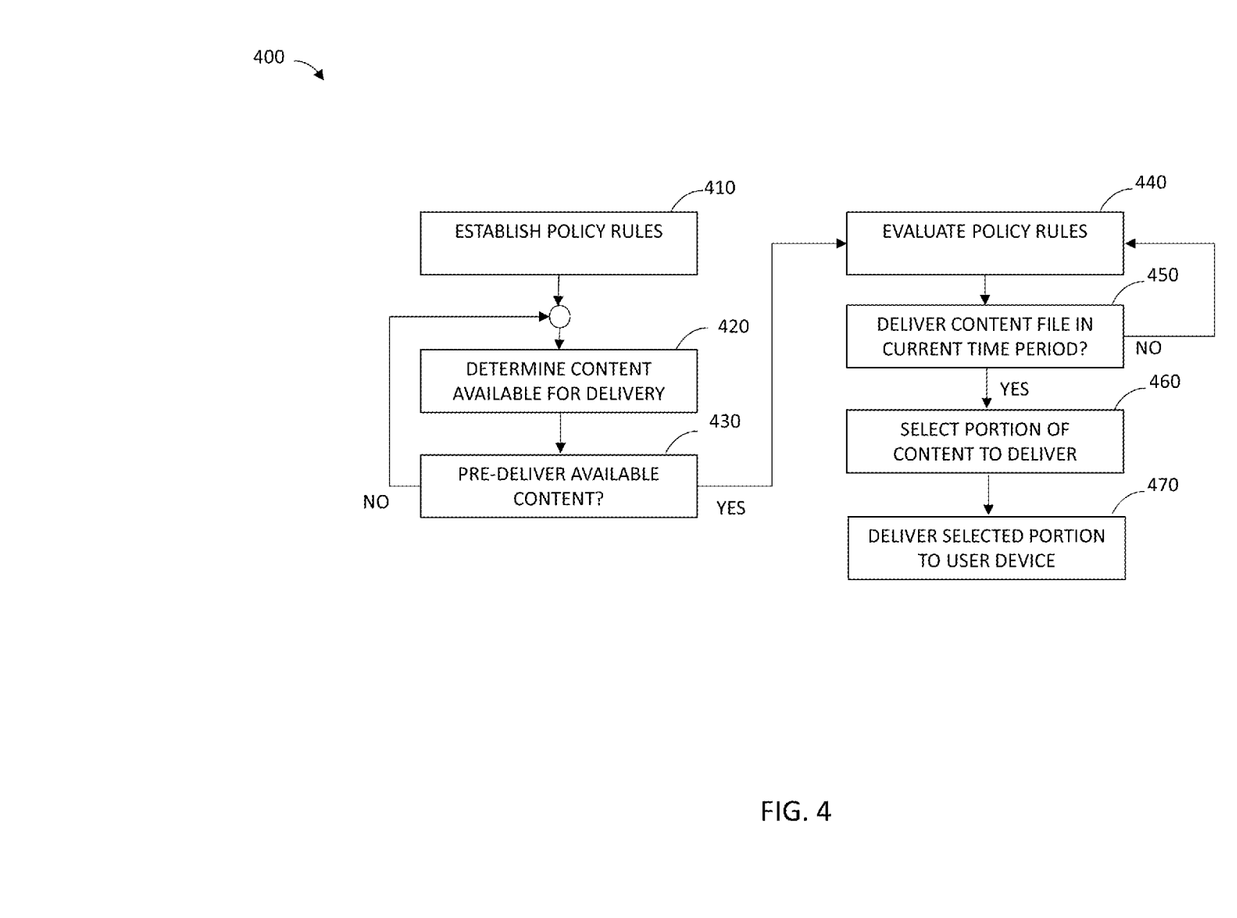
FIG. 4 is a flow diagram illustrating a method for providing content to a user device.

As described herein, the conditional pre-delivery system 150 enables a client resident on a user device to pre-deliver content to local storage of the user device during selected or predetermined delivery windows. FIG. 4 is a flow diagram illustrating a method 400 for providing content to a user device. The method 400 may be performed by the conditional pre-delivery system 150 and, accordingly, is described herein merely by way of reference thereto. It will be appreciated that the method 400 may be performed on any suitable hardware.

In operation 410, the conditional pre-delivery system 150 establishes and configured delivery policy rules associated with allowable conditions (e.g., network conditions) for content pre-delivery. As described herein, the allowable conditions may include current conditions, past or historical conditions, and/or future, expected, or predicted conditions. The delivery rules, which may be static and predetermined, are based on the conditions, and identify pre-delivery actions to be performed in response to a delivery window (e.g., a time period) satisfying certain conditions.

In operation 420, the conditional pre-delivery system 150 identifies content available for pre-delivery to the user device. As described herein, the conditional pre-delivery system 150 may receive information from the policy server 140 that identifies content items available for pre-delivery to the user device 110, such as content items at the remote content servers 120*a-c* and associated with mobile applications 116 of the user device 110 that play multimedia content (e.g., video, audio, and so on).

In operation 430, the conditional pre-delivery system 150 determines whether to pre-deliver some or all of the available content to the user device. As described herein, the conditional pre-delivery system 150 may determine whether to pre-deliver content based on an amount of available local storage for pre-delivered content, a determined likelihood that a user will consume the pre-delivered content, and so on.

When the conditional pre-delivery system 150 determines there is content to pre-deliver, the conditional pre-delivery system 150, in operation 440, evaluates the established policy rules for pre-delivery of content to the user device. In operation 450, the conditional pre-delivery system 150 determines whether to pre-deliver content at a current time or during an occurrence of a delivery window (e.g., determines whether pre-delivery conditions are met). In some embodiments, the conditional pre-delivery system 150 may periodically determine whether to pre-deliver content, may determine whether to pre-deliver content based on a triggering event (e.g., a change in network metrics or conditions), and so on.

When the conditional pre-delivery system 150 determines that predetermined pre-delivery conditions are met or satisfied (e.g., there is an occurrence of a delivery window), the conditional pre-delivery system 150, in operation 460, selects a portion of the available content to pre-deliver, and, in operation 470, causes the pre-delivery of the selected portion to the user device.

Figure 5:
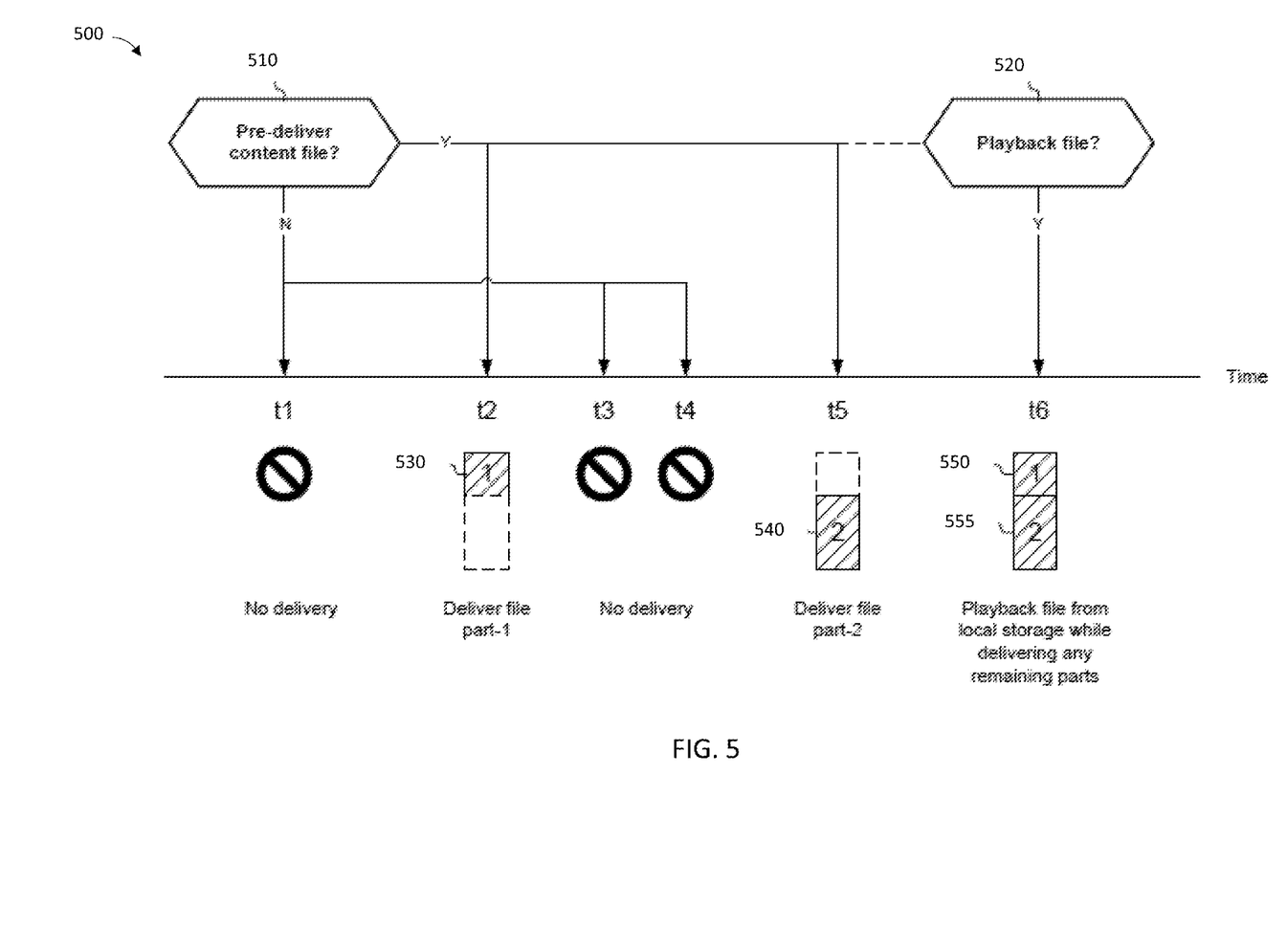
FIG. 5 is a block diagram illustrating the conditional pre-delivery of content to a user device.

Thus, in some embodiments, the conditional pre-delivery system 150 identifies conditions associated with content delivery networks and applies pre-delivery rules based on the conditions to determine an appropriate or suitable delivery window within which to pre-deliver content to user devices. FIG. 5 is a block diagram 500 illustrating a sequence associated with a pre-delivery of content to a user device, between an action 510 to pre-deliver content to a user device, and an action 520 to playback the content at the user device.

At a time t1, the client defers the pre-delivery of content, and consequently no file delivery action occurs. At a time t2, the conditional pre-delivery system 150 determines the network conditions meet the criteria for delivery of a first part 530 of the selected file. For example, the size of the file part may be dependent on a pre-cache size algorithm and may be any fraction from 0 to 100% of the total file.

At times t3 and t4 the conditional pre-delivery system 150 determines the network conditions do not meet the criteria for delivery of the remaining portions of the file, and defer further pre-delivery of the remaining portions of the file. At a time t5, the conditional pre-delivery system 150 determines to pre-deliver a second portion 540 of the file. Thus, FIG. 5 depicts an example delivery window during which to pre-deliver content items as a window that includes time t2 and time t5 (e.g., multiple intermittent times within the sequence where pre-delivery conditions are met).

Once pre-delivery is complete, at a time t6 (e.g., some arbitrary time later) a user requests access to the file via an application running on the user device. Playback of the file begins using the locally stored content, and, if the entire content file has not already been delivered, the remainder is downloaded in parallel with the playback process.

Thus, in some embodiments, the conditional pre-delivery system 150 determines an occurrence of one or more predetermined pre-delivery conditions associated with a network via which to pre-deliver content to the user device, identifies one or more content items located at a remote content server are available for pre-delivery to the user device, and causes at least a portion of the identified one or more content items to be delivered to the user device during the occurrence of the one or more predetermined pre-delivery conditions.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method performed by a user device, the method comprising:
   determining that a content item is available for pre-delivery from a content server to the user device over a network via a received indication;
   in response to determining that the content item is available for pre-delivery, selecting a delivery window that satisfies a first pre-delivery policy condition associated with pre-delivery of content to the user device; and
   identifying pre-delivery request triggering actions to be performed in response to the selected delivery window satisfying the first pre-delivery policy condition upon commencement of the selected delivery window, including:
triggering an entire portion of the content item for pre-delivery to the user device when the delivery window satisfies the first pre-delivery policy condition and a second pre-delivery policy condition, and
triggering a partial portion of the content item for pre-delivery to the user device when the delivery window satisfies the first pre-delivery policy condition without satisfying the second pre-delivery policy condition.

2. The method of claim 1, further comprising:
in response to triggering the entire portion or the partial portion of the content item for pre-delivery, causing at least part of the content item to be pre-delivered to the user device upon commencement of the selected delivery window and before receiving a request from a user associated with the user device to playback the content.

3. The method of claim 1, wherein selecting a delivery window that satisfies the first pre-delivery policy condition associated with pre-delivery of content to the user device includes selecting a delivery window when the user device is connected to a type of network via which to pre-deliver content to the user device.

4. The method of claim 1, wherein selecting a delivery window that satisfies the first pre-delivery policy condition associated with pre-delivery of content to the user device includes selecting a time window that currently satisfies the first pre-delivery policy condition associated with pre-delivery of content to the user device.

5. The method of claim 1, wherein selecting a delivery window that satisfies the first pre-delivery policy condition associated with pre-delivery of content to the user device includes selecting a future time window predicted to satisfy the first pre-delivery policy condition associated with pre-delivery of content to the user device.

6. The method of claim 1, wherein selecting a delivery window that satisfies the first pre-delivery policy condition associated with pre-delivery of content to the user device includes selecting a future time window associated with historical pre-delivery of content to the user device.

7. The method of claim 1, wherein selecting a delivery window that satisfies the first pre-delivery policy condition associated with pre-delivery of content to the user device includes: determining a predicted time period within which a user of the user device will request playback of the content based on previous playback patterns associated with the user; and selecting a delivery window that satisfies the first pre-delivery policy condition and occurs before the predicted time period.

8. The method of claim 1, wherein selecting a delivery window that satisfies the first pre-delivery policy condition associated with pre-delivery of content to the user device includes: determining a predicted time period within which a user of the user device will request playback of the content based on previous playback patterns associated with the content; and selecting a delivery window that satisfies the first pre-delivery policy condition and occurs before the predicted time period.

9. The method of claim 1, wherein at least one of the first and second pre-delivery policy conditions includes a condition that the user device is connected to a pre-delivery network, the pre-delivery network being a wireless network.

10. The method of claim 1, wherein at least one of the first and second pre-delivery policy conditions include a condition that the user device is connected to a pre-delivery network, the pre-delivery network performing above a certain quality threshold.

11. The method of claim 1, wherein at least one of the first and second pre-delivery policy conditions includes a condition that the user device is connected to a pre-delivery network, the pre-delivery network having a specific operator associated with the user device.

12. The method of claim 1, wherein at least one of the first and second pre-delivery policy conditions include a certain time period within which to pre-deliver content to the user device.

13. The method of claim 1, wherein at least one of the first and second pre-delivery policy conditions includes a condition that the user device is located at a certain location at which to pre-deliver content to the user device.

14. A user device which includes a conditional pre-delivery system comprising:
a content module that receives an indication that a content item is available for pre-delivery from a content server connected to the user device over a network;
a policy module that in response to receiving the indication that the content item is available for pre-delivery, selects a delivery window that satisfies a first pre-delivery policy condition associated with pre-delivery of content to the user device; and
a pre-delivery module that identifies pre-delivery request triggering actions to be performed upon commencement of the selected delivery window, in response to the selected delivery window satisfying the first pre-delivery policy condition,
an entire portion of the content item being triggered for pre-delivery to the user device when the delivery window satisfies the first pre-delivery policy condition and a second pre-delivery policy condition, and
a partial portion of the content item being triggered for pre-delivery to the user device when the delivery window satisfies the first pre-delivery policy condition without satisfying the second pre-delivery policy condition.

15. The device of claim 14, wherein the pre-delivery module causes the content to be delivered to the user device before receiving a request from a user associated with the user device to playback the content.

16. The device of claim 14, wherein the policy module selects a delivery window that satisfies a condition that the user device is connected to a suitable network type via which to pre-deliver content to the user device.

17. The device of claim 14, wherein the policy module selects a future delivery window predicted to satisfy the first pre-delivery condition, the first pre-delivery condition being a condition that the user device is connected to a suitable network via which to pre-deliver content to the user device.

18. A non-transient computer-readable medium (CRM) including computer programming product, which, when executed by a user device, cause the user device to perform steps comprising:
determining that a content item is available for pre-delivery from a content server to the user device over a network via a received indication;
in response to determining that the content item is available fro pre-delivery, selecting a delivery window that satisfies a first pre-delivery policy condition associated with pre-delivery of content to the user device; and
identifying pre-delivery request triggering actions to be performed in response to the selected delivery window satisfying the first pre-delivery policy condition upon commencement of the selected delivery window, including:
triggering an entire portion of the content item for pre-delivery to the user device when the delivery window satisfies the first pre-delivery policy condition and a second pre-delivery policy condition, and
triggering a partial portion of the content item for pre-delivery to the user device when the delivery window satisfies the first pre-delivery policy condition without satisfying the second pre-delivery policy condition.

19. The CRM of claim 18, wherein the steps further comprise:
in response to identifying triggering the entire portion or the partial portion of the content item for pre-delivery, causing at least part of the content item to be pre-delivered to the user device upon commencement of the selected delivery window and before receiving a request from a user associated with the user device to playback the content.

20. The CRM of claim 18, wherein selecting a delivery window that satisfies the first pre-delivery policy condition associated with pre-delivery of content to the user device includes: determining a predicted time period within which a user of the device will request playback of the content based on previous playback patterns associated with the user; and selecting a delivery window that satisfies the first pre-delivery policy condition and occurs before the predicted time period.

* * * * *